United States Patent Office 3,686,122

Patented Aug. 22, 1972

3,686,122

PIEZOELECTRIC MATERIALS

Noboru Ichinose, Harutoshi Egami, Katsunori Yokoyama, and Yohachi Yamashita, Yokohama, Japan, assignors to Tokyo Shibaura Electric Co., Ltd., Kawasaki-shi, Japan Filed May 26, 1971, Ser. No. 147,150
Claims priority, application Japan, May 28, 1970, 45/45,197
Int. Cl. C04b *35/46, 35/48*
U.S. Cl. 252—62.9 1 Claim

ABSTRACT OF THE DISCLOSURE

Piezoelectric materials of a ternary metal oxide system comprising 0.3 to 20.0 mole percent of $A(Me_{1/2}Te_{1/2})O_3$ (where A denotes at least one metal selected from the group of barium, strontium and calcium and Me represents at least one metal selected from the group of magnesium and zinc), 57.0 to 35.0 mol percent of $PbTiO_3$ and 55.0 to 25.0 mol percent of $PbZrO_3$.

This invention relates to piezoelectric metal oxide materials and more particularly to piezoelectric metal oxide materials of a ternary metal oxide system prepared by solid phase reaction from a plurality of metal oxides having different valances and characterized by high piezoelectric properties and excellent stability and in consequence well adapted for use as, for example, electromechanical conversion elements.

As is well known, piezoelectric materials are applied in a broad field including, for example, transducer elements for mechanical filters, elements for ceramic filters, and elements for pickups, microphones and oscillographs as well as ignition elements for gas implements. For such uses, there have been developed improved forms of piezoelectric materials comprising a binary oxide system of $PbTiO_3$-$PbZrO_3$ (having a substantially equal mol percent). Attempts have been made to effect improvement by adding, for example, CdO or ZnO to said binary metal oxide system of $$PbTiO_3\text{-}PbZrO_3$$

However, said product has the drawbacks that it has an electro-mechanical coupling coefficient $K_p$ of only 37 to 48%, and its piezoelectric properties appreciably vary with time or temperature. There have also been proposed piezoelectric materials of the ternary metal oxide system $PbTiO_3$-$PbZrO_3$-$Pb(Mg_{1/3}Nb_{2/3})O_3$. However, this ternary product generally has an electro-mechanical coupling coefficient of about 50% at most and a mechanical quality factor $Q_m$ of only 600 max. (The product whose mechanical quality factory $Q_m$ indicates 568 has an electro-mechanical coefficient of only 7.5%.) Generally speaking, piezoelectric materials are desired to have as high an electro-mechanical coupling coefficient as possible.

When piezoelectric materials are subjected, after polarization, to a strong mechanical pressure across the opposite electrodes, high voltage is generated. Therefore, these materials can be used in various applications including the production of spark discharges across electrodes utilizing said voltage.

The properties of piezoelectric materials adapted for such applications can be evaluated by various constants generally associated therewith (for example, electromechanical coupling coefficient, output voltage coefficient, and dielectric constant). On application of a high mechanical pressure, there often arise decreases in output voltage and consequently in the electro-mechanical coupling coefficient (hereinafter designated as $K_{33}$), which raises an important practical problem. Accordingly, piezoelectric materials should be manufactured considering not only said constants but also such declines in output voltage.

It is accordingly an object of this invention to provide very stable piezoelectric materials which, though repeatedly subjected to a pressure of 0.5 to 2 ton/cm.$^2$ are least liable to decrease in piezoelectric properties, and which are capable of constantly generating a desired high voltage.

Another object of the invention is, therefore, to provide piezoelectric materials adapted to produce spark discharges for the ignition of, for example, gas implements and small capacity engines.

This invention can be more fully understood from the following detailed description when taken in connection with reference to the accompanying drawings, in which.

Figure 4:
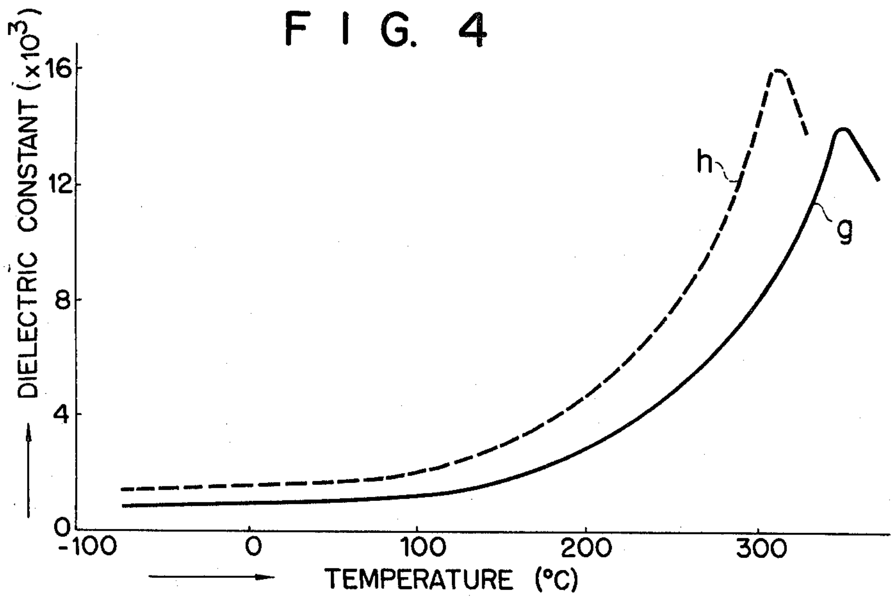
FIG. 4 is a curve diagram showing the dielectric constant with respect to temperature of two examples of the invention.
Figure 5:
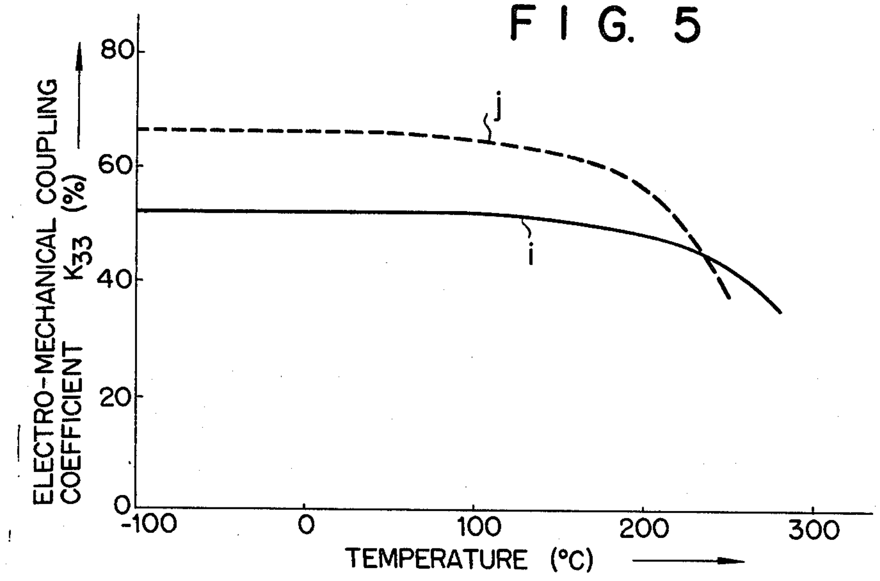
Figure 6:
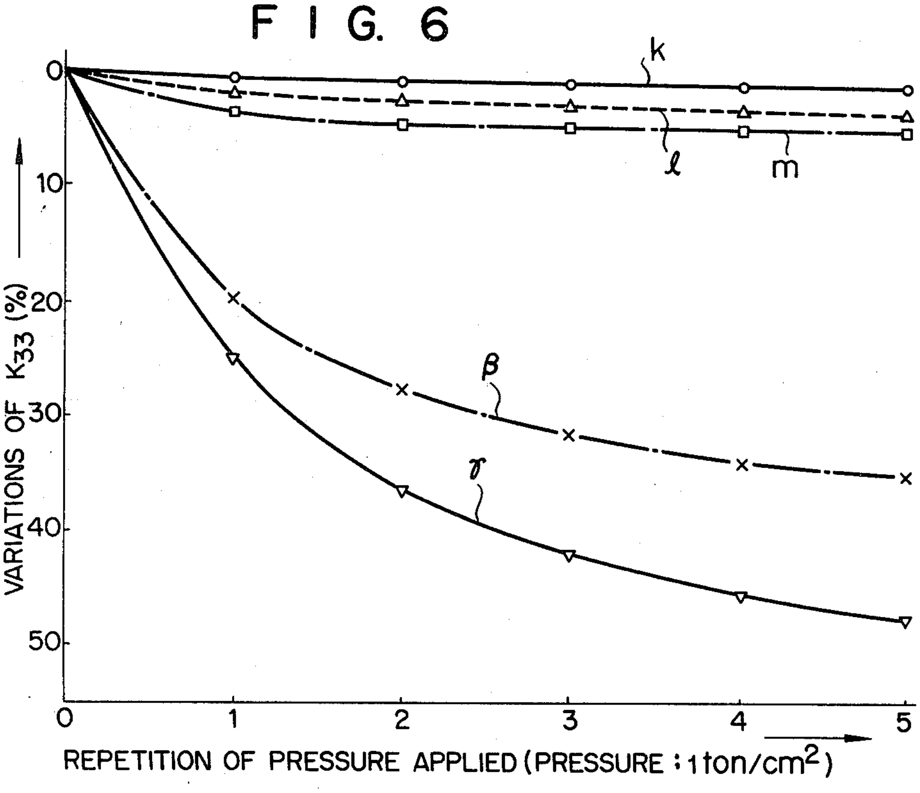

FIG. 5 is a curve diagram showing the electro-mechanical coupling coefficient $K_{33}$ with respect to temperature of the two examples of FIG. 4; and FIG. 6 is a curve diagram showing changes in the electromechanical coupling coefficient $K_{33}$ with respect to repeated applications of pressure, as compared between three other examples of the invention and two reference samples of the prior art piezoelectric materials.

The piezoelectric material of the invention is prepared by solid phase reaction from a plurality of metal oxides having different valences, namely, by substituting part of a binary metal oxide system of $PbTiO_3$-$PbZrO_3$ with $A(Me_{1/2}Te_{1/2})O_3$ of perovskite structure (where A is at least one metal selected from the group of Ba, Sr and Ca, and Me is at least one metal selected from the group of Mg and Zn), thus constituting a ternary metal oxide system of $A(Me_{1/2}Te_{1/2})O_3$-$PbTiO_3$-$PbZrO_3$. The piezoelectric metal oxide material of the invention is characterized in that it consists of 20.0 to 0.3 mol percent of $A(Me_{1/2}Te_{1/2})O_3$, 57.0 to 35.0 mol percent of $PbTiO_3$ and 55.0 to 25.0 mol percent of $PbZrO_3$ (the proportions of these three components are so chosen as to total 100 mol percent).

The aforesaid piezoelectric metal oxide material of the invention can generally be easily manufactured by the known powder metallurgical process. For illustration, there are accurately weighed out the prescribed proportions of raw metal oxides such as AO, $TiO_2$, $ZrO_2$, $TeO_3$ and MeO (where A:Ba, Sr, Ca; Me:Mg, Zn). They are thoroughly mixed, for example, in a ball mill. The raw materials may also consist of hydroxides, carbonates or oxalates of metals or the like which can be thermally converted to oxides. The mixture is prefired at a temperature of, for example, about 600° to 900° C. and pulverized again in a ball mill to obtain powders controlled to a particle size of about 1 to 2 microns. To said powders is added a binder such as water or polyvinyl alcohol, and the resulting mass is made into a flat body at a pressure of about 0.5 to 2 ton/cm.$^2$ and further sintered at a temperature of about 1000° to 1270° C. Since PbO, one of the components, tends to be evaporated off during this sintering, the operation is performed in a closed furnace. The sufficient time during which the mass should be maintained at a maximum temperature generally ranges between 0.5 and 3 hours. Said flat sintered body of metal oxides is polarized by fitting a pair of electrodes to both sides thereof, for example, by baking silver layers therein and impressing across the electrodes a voltage having a D.C. field intensity of 20 to 30 kv./cm. for about one hour in silicone oil at a temperature of about 140° to 160° C.

Figure 1:
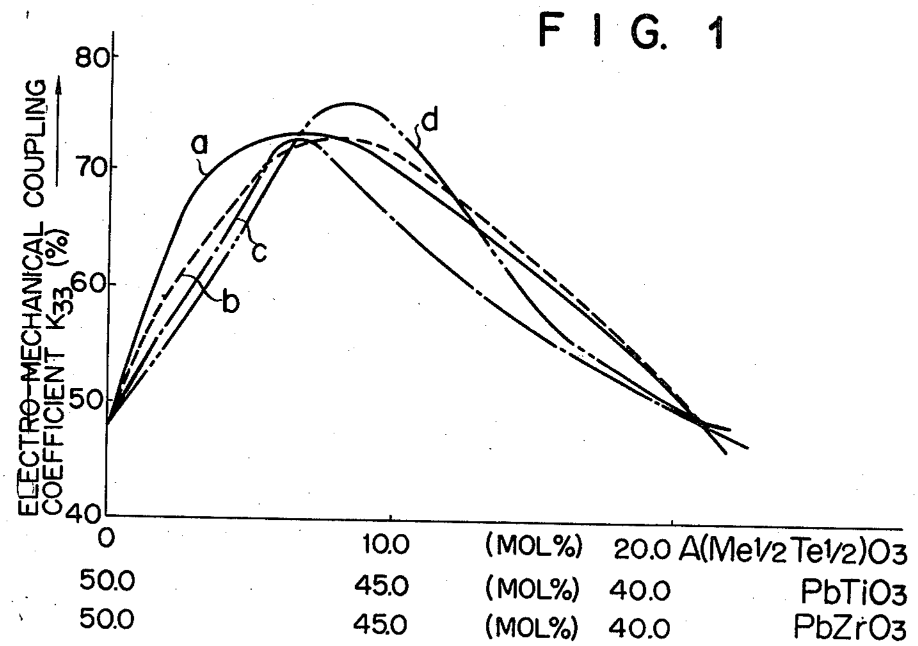
FIG. 1 is a curve diagram showing changes in the electro-mechanical coupling coefficient $K_{33}$ of four kinds of piezoelectric materials prepared from a ternary metal oxide system according to this invention, where the proportions of the components of said system were varied.

The proportions of $A(Me_{1/2}Te_{1/2})O_3$, $PbTiO_3$ and $PbZrO_3$ are limited as described above for the following reasons. If the content of $A(Me_{1/2}Te_{1/2})O_3$ increases over 20.0 mol percent, a piezoelectric material having an electro-mechanical coupling coefficient $K_{33}$ of 50% required for piezoelectric ignition can not be obtained. For instance, when there was determined the electro-mechanical coupling coefficient $K_{33}$ of a piezoelectric metal oxide material by varying the proportions of its components: $A(Me_{1/2}Te_{1/2})O_3$, $PbTiO_3$ and $PbZrO_3$, there was observed the tendency shown in FIG. 1. Where the amount of $A(Me_{1/2}Te_{1/2})O_3$ fell outside of the range of 20.0 to 0.3 mol percent, the resultant product did not have the desired piezoelectric properties. In FIG. 1, the curve (a) represents the case of A:Ba and Me:Mg; the curve (b) the case of A:Ba and Me:Zn; the curve (c) the case of A:Ca and Me:Mg; and the curve (d) the case of A:Sr and Me:Zn.

Figure 2:
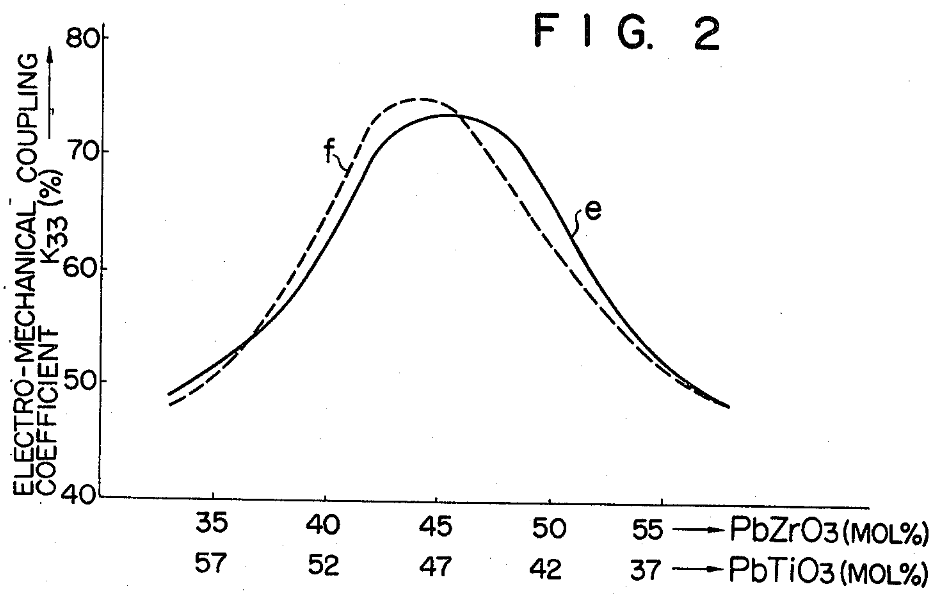
FIG. 2 is a curve diagram showing changes in the electro-mechanical coupling coefficient $K_{33}$ of piezoelectric materials of a ternary metal oxide system according to the invention, where the proportions of $Sr(Mg_{1/2}Te_{1/2})O_3$ and $Sr(Zn_{1/2}Te_{1/2})O_3$ remained unchanged and the proportions of $PbTiO_3$ and $PbZrO_3$ were varied.
Figure 3:
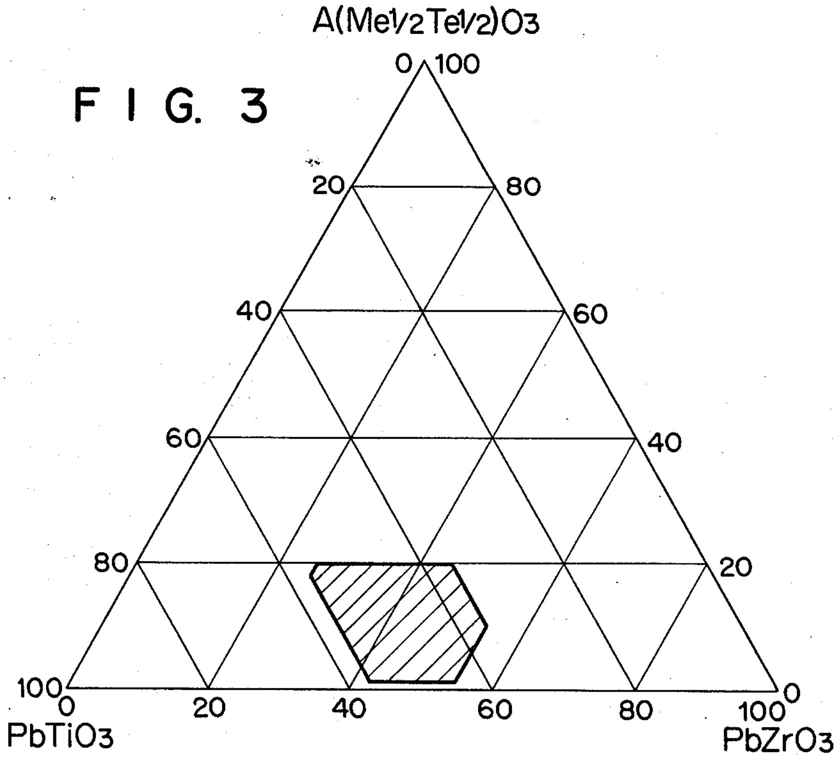
FIG. 3 is a triangular chart showing a range within which there should preferably fall the composition of piezoelectric materials of a ternary metal oxide system according to the invention.

The reason why the proportion of $PbTiO_3$ is limited to the range of 57.0 to 35.0 is that either below 35.0 mol percent or above 57.0 mol percent, there can not be obtained a piezoelectric material having a large electromechanical coupling coefficient $K_{33}$. For example, where there were determined the piezoelectric properties of a piezoelectric material with the proportion of $$Sr(Me_{1/2}Te_{1/2})O_3$$

fixed and the proportions of $PbTiO_3$ and $PbZrO_3$ varied, then there was observed the tendency shown in FIG. 2. The curve (e) denotes the case of Me:Mg and the curve (f) the case of Me:Zn. As apparent from FIGS. 1 and 2, where the content of $PbTiO_3$ fell to below 35.0 mol percent, a piezoelectric material having the required properties was not produced. Where said content rose above 57.0 mol percent, the resultant product did not have desired piezoelectric properties or was not satisfactory in respect of stability, though said piezoelectric properties themselves did not pose any problem from the practical standpoint. Therefore, the proportion of $PbTiO_3$ should always be selected from the aforementioned range. Further, the remaining component $PbZrO_3$ of the basic composition of $A(Me_{1/2}Te_{1/2})O_3$-$PbTiO_3$-$PbZrO_3$ should be used in amounts falling within the range of 25.0 to 55.0 mol percent in order to obtain desired piezoelectric properties. The proportions of the three components should be defined within the hatched region of FIG. 3 showing a ternary metal oxide system. The component of $A(Me_{1/2}Te_{1/2})O_3$ concurrently acts as a sort of mineralizer to facilitate sintering. This ease of sintering eventually reduces required temperature to restrict the evaporation of PbO, a component of the basic composition, thus enabling a compact piezoelectric material to be finally manufactured.

As mentioned above, the piezoelectric oxide material of this invention mainly consists of a uniform solid solution of AO, $TiO_2$, $ZrO_2$, $TeO_3$ and MeO and is of perovskite structure (as confirmed by X-ray analysis). Where the composition is expressed by the general formula $A'B'O_3$, then A' denotes divalent Ba, Sr and Ca, and B' represents divalent Me, hexavalent Te and tetravalent Ti and Zr. The piezoelectric material of this invention is composed of a plurality of elements having different valences and is essentially different from the prior art piezoelectric material mainly consisting of octahedral oxygen, wherein, if the composition is expressed by the general formula of $A''B''O_3$, B'' represents tetravalent elements, when A'' denotes divalent elements or B'' represents pentavalent elements, in case A'' denotes monovalent elements, that is, A'' and B'' respectively consist of a combination of elements having the same valence. Thus the piezoelectric material of this invention not only has excellent piezoelectric properties which little vary with time or temperature, but also always exhibits a specified performance.

Where determination was made of changes in the voltage in which piezoelectric materials used as ignition elements generated on impact, the conventional product of a binary $PbTiO_3$-$PbZrO_3$ system exhibited a 15% decrease in output voltage at a millionth time of impact. In contrast, the piezoelectric material of this invention only exhibited a 5% decline in output voltage under the same condition.

Since reduced output voltage observed in the durability or pressure test of piezoelectric materials used as ignition elements eventually results in a decline in the reliability of ignition, the product of this invention may be considered highly advantageous in practical application.

The invention will be more fully understood by reference to the examples which follow.

There were accurately weighed out AO, $TiO_2$, $ZrO_2$, $TeO_3$ and MeO so as to form 0 to 22 mol percent of $A(Me_{1/2}Te_{1/2})O_3$, 24 to 57 mol percent of $PbTiO_3$ and the remaining portion of $PbZrO_3$. The mixture was pulverized to a particle size of 1 to 2 microns in a ball mill and prefired at a temperature of 850° C. There were also prepared reference samples of the prior art piezoelectric materials by subjecting the raw materials to the same treatment. Thus there were provided eighty-one powdered samples of both the present invention and prior art. To the samples was added polyvinyl alcohol as a binder. The resulting mass was subjected to a pressure of 1 ton/cm.$^2$ and heated one hour at a temperature of 1000° to 1280° C. to be sintered, to produce discs 1 mm. thick and 13 mm. in diameter and round rods 7 mm. in diameter and 15 mm. long.

The discs obtained were tested to determine specific gravity. Both discs and rods were polarized by applying voltage having D.C. field intensity of 30 kv./cm. one hour in silicone oil at 140° C. and determined for piezoelectric properties by the standard method set forth in the Proceeding of IRE (vol. 137, pp. 1378–1395, 1949). The results are presented in Table 1 together with the compositions of the sintered samples. Referring to Table 1, F.T. represents sintering temperature (° C.), D, specific gravity (at 23° C.), ε, dielectric constant (1 kilo Hz. at 23° C.) and $K_{33}$, electro-mechanical coupling coefficient (percent), the table also reports the decrease in $K_{33}$ at the millionth time of impact.

TABLE 1

| Test materials | $PbTiO_3$ (mol percent) | $PbZrO_3$ (mol percent) | $A(Me_{1/3}Te_{2/3})\cdot O_3$ A | Me | Mol percent | F.T. | D | ε | $K_{33}$ | Decrease in $K_{33}$ (percent) |
|---|---|---|---|---|---|---|---|---|---|---|
| Reference: | | | | | | | | | | |
| 1 | 60.0 | 40.0 | ------ | ------ | 0 | 1,280 | 7.41 | 853 | 40.6 | 20.8 |
| 2 | 60.0 | 30.0 | Ba | Mg | 10.0 | 1,260 | 7.48 | 960 | 46.3 | 11.8 |
| 3 | 60.0 | 30.0 | Sr | Zn | 10.0 | 1,260 | 7.51 | 996 | 47.7 | 13.4 |
| 4 | 60.0 | 20.0 | Ca | Mg | 20.0 | 1,240 | 7.46 | 842 | 44.9 | 12.5 |
| 5 | 60.0 | 20.0 | Ba | Zn | 20.0 | 1,240 | 7.45 | 831 | 43.5 | 10.7 |
| Example: | | | | | | | | | | |
| 1 | 57.0 | 42.7 | Sr | Zn | 0.3 | 1,270 | 7.50 | 972 | 50.4 | 4.0 |
| 2 | 57.0 | 42.7 | Ca | Mg | 0.3 | 1,270 | 7.52 | 933 | 50.2 | 3.9 |
| 3 | 57.0 | 42.7 | Ba | Mg | 0.3 | 1,270 | 7.51 | 984 | 50.3 | 4.0 |
| 4 | 57.0 | 36.0 | Ba | Mg | 7.0 | 1,250 | 7.58 | 1,248 | 54.6 | 2.7 |
| 5 | 57.0 | 36.0 | Sr | Zn | 7.0 | 1,250 | 7.60 | 1,295 | 53.8 | 2.0 |
| 6 | 57.0 | 36.0 | Ca | Mg | 7.0 | 1,250 | 7.61 | 1,203 | 52.2 | 3.1 |
| 7 | 57.0 | 30.0 | Ba | Zn | 13.0 | 1,220 | 7.62 | 1,461 | 55.8 | 3.6 |
| 8 | 57.0 | 30.0 | Sr | Mg | 13.0 | 1,220 | 7.61 | 1,518 | 54.0 | 3.3 |
| 9 | 57.0 | 30.0 | Ca | Zn | 13.0 | 1,220 | 7.59 | 1,406 | 53.3 | 2.9 |
| 10 | 57.0 | 25.0 | Ba | Mg | 18.0 | 1,200 | 7.55 | 1,310 | 50.6 | 1.5 |
| 11 | 57.0 | 25.0 | Sr | Zn | 18.0 | 1,200 | 7.54 | 1,287 | 50.3 | 1.3 |
| 12 | 57.0 | 25.0 | Ca | Mg | 18.0 | 1,200 | 7.52 | 1,184 | 50.1 | 0.8 |
| 13 | 50.0 | 49.5 | Ba | Zn | 0.5 | 1,240 | 7.56 | 1,091 | 51.5 | 2.6 |
| 14 | 50.0 | 49.5 | Sr | Mg | 0.5 | 1,240 | 7.55 | 1,043 | 52.0 | 2.4 |
| 15 | 50.0 | 49.5 | Ca | Zn | 0.5 | 1,240 | 7.57 | 1,058 | 51.7 | 3.0 |
| 16 | 50.0 | 44.0 | Ba | Mg | 6.5 | 1,210 | 7.62 | 1,563 | 65.4 | 3.5 |
| 17 | 50.0 | 44.0 | Sr | Zn | 600 | 1,210 | 7.64 | 1,686 | 68.1 | 4.0 |
| 18 | 50.0 | 44.0 | Ca | Mg | 6.0 | 1,210 | 7.65 | 1,460 | 64.9 | 3.2 |
| 19 | 50.0 | 36.0 | Ba | Mg | 14.0 | 1,190 | 7.63 | 1,735 | 63.4 | 2.8 |
| 20 | 50.0 | 36.0 | Sr | Zn | 14.0 | 1,190 | 7.60 | 1,811 | 62.9 | 2.7 |
| 21 | 50.0 | 36.0 | Ca | Mg | 14.0 | 1,190 | 7.62 | 1,543 | 61.8 | 2.5 |
| 22 | 50.0 | 30.0 | Ba | Mg | 20.0 | 1,170 | 7.55 | 1,321 | 51.4 | 1.8 |
| 23 | 50.0 | 30.0 | Sr | Zn | 20.0 | 1,170 | 7.56 | 1,486 | 50.9 | 1.6 |
| 24 | 50.0 | 30.0 | Ca | Zn | 20.0 | 1,170 | 7.54 | 1,300 | 50.7 | 1.5 |
| 25 | 45.0 | 54.5 | Ba | Zn | 0.5 | 1,220 | 7.58 | 1,074 | 54.1 | 1.7 |
| 26 | 45.0 | 54.5 | Ba | Mg | 0.5 | 1,220 | 7.57 | 1,083 | 53.9 | 2.0 |
| 27 | 45.0 | 54.5 | Sr | Zn | 0.5 | 1,220 | 7.55 | 1,115 | 55.2 | 2.1 |
| 28 | 45.0 | 54.5 | Sr | Mg | 0.5 | 1,220 | 7.57 | 1,181 | 54.6 | 1.9 |
| 29 | 45.0 | 54.5 | Ca | Zn | 0.5 | 1,220 | 7.54 | 1,018 | 52.6 | 1.4 |
| 30 | 45.0 | 54.5 | Ca | Mg | 0.5 | 1,220 | 7.55 | 1,009 | 52.8 | 1.3 |
| 31 | 45.0 | 47.0 | Ba | Mg | 8.0 | 1,180 | 7.68 | 2,115 | 72.2 | 3.8 |
| 32 | 45.0 | 47.0 | Sr | Zn | 8.0 | 1,180 | 7.65 | 2,316 | 71.5 | 3.5 |
| 33 | 45.0 | 47.0 | Ca | Mg | 8.0 | 1,180 | 7.66 | 2,002 | 70.9 | 3.1 |
| 34 | 45.0 | 47.0 | Ba<br>Sr | Mg<br>Zn | 4.0<br>4.0 | 1,180 | 7.70 | 2,418 | 74.6 | 4.0 |
| 35 | 45.0 | 47.0 | Sr<br>Ca | Zn<br>Mg | 5.0<br>3.0 | 1,180 | 7.69 | 2,385 | 73.3 | 2.9 |
| 36 | 45.0 | 47.0 | Ba<br>Ca | Zn<br>Mg | 2.0<br>6.0 | 1,180 | 7.64 | 2,103 | 72.5 | 3.2 |
| 37 | 45.0 | 47.0 | Ba<br>Sr<br>Ca | Zn<br>Mg<br>Zn | 4.0<br>3.0<br>1.0 | 1,180 | 7.71 | 2,514 | 75.4 | 2.8 |
| 38 | 45.0 | 43.0 | Ba | Mg | 12.0 | 1,160 | 7.66 | 2,246 | 68.8 | 2.6 |
| 39 | 45.0 | 43.0 | Sr | Zn | 12.0 | 1,160 | 7.68 | 2,310 | 67.9 | 2.4 |
| 40 | 45.0 | 43.0 | Ca | Zn | 12.0 | 1,160 | 7.67 | 2,084 | 68.1 | 2.5 |
| 41 | 45.0 | 43.0 | Ba | Zn | 6.0 | 1,160 | 7.69 | 2,347 | 70.4 | 2.2 |
| 42 | 45.0 | 37.0 | Ba | Zn | 18.0 | 1,140 | 7.60 | 1,775 | 57.3 | 1.5 |
| 43 | 45.0 | 37.0 | Sr | Mg | 18.0 | 1,140 | 7.63 | 1,843 | 58.1 | 1.3 |
| 44 | 45.0 | 37.0 | Ca | Zn | 18.0 | 1,140 | 7.62 | 1,561 | 54.9 | 1.1 |
| 45 | 45.0 | 37.0 | Ba<br>Sr<br>Ca | Mg<br>Zn<br>Mg | 6.0<br>6.0<br>6.0 | 1,140 | 7.64 | 1,798 | 56.8 | 1.0 |
| 46 | 40.0 | 55.0 | Ba | Zn | 5.0 | 1,200 | 7.56 | 1,007 | 51.4 | 1.8 |
| 47 | 40.0 | 55.0 | Sr | Mg | 5.0 | 1,200 | 7.53 | 986 | 52.1 | 1.4 |
| 48 | 40.0 | 55.0 | Ca | Zn | 5.0 | 1,200 | 7.55 | 959 | 51.9 | 1.2 |
| 49 | 40.0 | 50.0 | Ba | Mg | 10.0 | 1,170 | 7.58 | 1,530 | 65.8 | 2.4 |
| 50 | 40.0 | 50.0 | Sr | Zn | 10.0 | 1,170 | 7.57 | 1,493 | 66.4 | 2.1 |
| 51 | 40.0 | 50.0 | Ca | Mg | 10.0 | 1,170 | 7.55 | 1,384 | 65.1 | 2.0 |
| 52 | 40.0 | 45.0 | Ba | Zn | 15.0 | 1,150 | 7.51 | 1,642 | 57.3 | 1.7 |
| 53 | 40.0 | 45.0 | Sr | Mg | 15.0 | 1,150 | 7.50 | 1,582 | 58.1 | 1.8 |
| 54 | 40.0 | 45.0 | Ca | Zn | 15.0 | 1,150 | 7.53 | 1,499 | 55.9 | 1.8 |
| 55 | 40.0 | 40.0 | Ba | Mg | 20.0 | 1,130 | 7.48 | 1,215 | 52.3 | 1.1 |
| 56 | 40.0 | 40.0 | Sr | Zn | 20.0 | 1,130 | 7.46 | 1,188 | 53.1 | 1.2 |
| 57 | 40.0 | 40.0 | Ca | Mg | 20.0 | 1,130 | 7.47 | 1,094 | 50.9 | 0.9 |
| 58 | 40.0 | 40.0 | Ba<br>Sr<br>Ca | Mg<br>Mg<br>Zn | 10.0<br>5.0<br>5.0 | 1,130 | 7.50 | 1,260 | 53.5 | 0.8 |
| 59 | 35.0 | 55.0 | Ba | Zn | 10.0 | 1,160 | 7.49 | 1,182 | 51.4 | 1.3 |
| 60 | 35.0 | 55.0 | Sr | Mg | 10.0 | 1,160 | 7.50 | 1,141 | 52.0 | 1.5 |
| 61 | 35.0 | 55.0 | Ca | Zn | 10.0 | 1,160 | 7.51 | 1,109 | 51.1 | 1.0 |
| 62 | 35.0 | 55.0 | Ba<br>Sr | Mg<br>Zn | 5.0<br>5.0 | 1,160 | 7.52 | 1,174 | 52.5 | 0.8 |
| 63 | 35.0 | 51.0 | Ba | Zn | 14.0 | 1,140 | 7.55 | 1,348 | 54.5 | 1.4 |
| 64 | 35.0 | 51.0 | Ba | Zn | 14.0 | 1,140 | 7.54 | 1,295 | 53.9 | 1.3 |
| 65 | 35.0 | 51.0 | Sr | Mg | 14.0 | 1,140 | 7.53 | 1,284 | 53.8 | 1.3 |
| 66 | 35.0 | 51.0 | Sr | Zn | 14.0 | 1,140 | 7.54 | 1,256 | 53.4 | 1.2 |
| 67 | 35.0 | 51.0 | Sr<br>Sr | Mg<br>Zn | 7.0<br>7.0 | 1,140 | 7.56 | 1,301 | 54.2 | 1.0 |
| 68 | 35.0 | 51.0 | Ca | Mg | 14.0 | 1,140 | 7.52 | 1,217 | 52.6 | 1.1 |
| 69 | 35.0 | 51.0 | Ca | Zn | 14.0 | 1,140 | 7.53 | 1,195 | 52.1 | 1.0 |
| 70 | 35.0 | 51.0 | Ca<br>Ca | Mg<br>Zn | 7.0<br>7.0 | 1,140 | 7.55 | 1,243 | 53.0 | 1.2 |
| 71 | 35.0 | 47.0 | Ba | Zn | 18.0 | 1,120 | 7.51 | 1,111 | 51.7 | 0.7 |
| 72 | 35.0 | 47.0 | Sr | Mg | 18.0 | 1,120 | 7.50 | 1,082 | 52.0 | 0.9 |
| 73 | 35.0 | 47.0 | Ca | Mg | 18.0 | 1,120 | 7.50 | 1,008 | 51.9 | 1.0 |
| 74 | 35.0 | 47.0 | Ba<br>Sr<br>Ca | Zn<br>Zn<br>Zn | 6.0<br>6.0<br>6.0 | 1,120 | 7.53 | 1,186 | 52.8 | 1.1 |
| Reference: | | | | | | | | | | |
| 6 | 34.0 | 57.0 | Ba | Zn | 9.0 | 1,160 | 7.43 | 1,013 | 49.3 | 5.8 |
| 7 | 54.0 | 24.0 | Sr | Zn | 22.0 | 1,170 | 7.48 | 1,147 | 48.9 | 6.2 |

Where determination was made of changes with temperature in the dielectric constant of Example 14 (Curie point 350° C.) and Example 49 (Curie point 310° C.), then there was observed the tendency shown in FIG. 4. The curve (g) represents Example 14 and the curve (h) Example 49. Where determination was made of changes with temperature in the electro-mechanical coupling coefficient $K_{33}$ of Examples 14 and 49, there were obtained the results of FIG. 5. The curve (i) represents Example 14 and the curve (j) Example 49. As apparent from FIG. 5, both test materials presented little variation in the electro-mechanical coupling coefficient $K_{33}$ over a temperature range of −100° to 200° C. due to the high Curie point, permitting the utilization of said coefficient at a fully high level under a stable condition.

There were prepared piezoelectric ignition units from piezoelectric materials having the same compositions as Examples 19, 43 and 52. Where determination was made of changes in the voltage generated by said ignition units, there were obtained the results of Table 2 below, which also gives for reference changes in the voltage generated by a piezoelectric ignition unit prepared from the prior art piezoelectric material having a composition of $$Pb(Ti_{0.47}Zr_{0.53})O_3 + 1.0 \text{ wt. percent } Nb_2O_5$$

represented by the referential sample α.

TABLE 2

| Test materials | Number of impact: 1st time | 1,000th time | 10,000th time | 100,000th time | Millionth time | Decrease in voltage |
|---|---|---|---|---|---|---|
| Example 16 | 15.8 | 15.7 | 15.6 | 15.4 | 15.2 | 3.8 |
| Example 33 | 16.0 | 16.0 | 15.9 | 15.8 | 15.6 | 2.5 |
| Example 53 | 15.3 | 15.3 | 15.3 | 15.2 | 14.9 | 2.6 |
| Reference α | 15.5 | 15.0 | 14.3 | 13.7 | 13.0 | 15.6 |

Table 2 above proves that the piezoelectric metal oxide materials of this invention have superior properties.

Where determination was made of changes in $K_{33}$ of elements prepared from piezoelectric materials having corresponding compositions to those of Examples 4, 25 and 34, as well as from the conventional compositions by subjecting them to repeated applications of a pressure of 1 ton/cm.$^2$, then there were obtained the results of FIG. 6. As seen from FIG. 6, the elements corresponding to Examples 4, 25 and 34 only presented a decline of less than 10% in output voltage, whereas the elements prepared from the prior art piezoelectric materials having compositions of $Pb(Ti_{0.46}Zr_{0.54})O_3 + 0.7$ wt. percent $Nb_2O_5$ represented by Reference β and $$Pb(Ti_{0.47}Zr_{0.53})O_3 + 0.8 \text{ wt. percent } La_2O_3$$

represented by Reference γ exhibited a large decrease of many percent. In FIG. 6, the curve (k) denotes Example 4, the curve (l) Example 25, the curve (m) Example 34, the curve β Reference β and the curve γ Reference γ.

As mentioned above, the piezoelectric materials of this invention have excellent properties which indicates little variation with time or temperature as proven by the tests, and consequently can display superior performance characteristic as transducer elements such as piezoelectric ignition elements, offering many industrial advantages.

What we claim is:

1. Piezoelectric metal oxide materials having a composition of 0.3 to 20.0 mol percent of $A(Me_{1/2}Te_{1/2})O_3$, where A is at least one metal selected from the group of Ba, Sr and Ca, and Me is at least one metal selected from the group of Mg and Zn, 57.0 to 35.0 mol percent of $PbTiO_3$ and 55.0 to 25.0 mol percent $PbZrO_3$, wherein the sum of $A(Me_{1/2}Te_{1/2})O_3$, $PbTiO_3$ and $PbZrO_3$ equals 100 mol percent.

References Cited

UNITED STATES PATENTS 3,268,453 8/1966 Ouchi et al. ........ 252—62.9
3,309,168 3/1967 Bayer ............ 252—62.9 X
3,463,732 8/1969 Banno et al. ....... 252—62.9
3,468,799 9/1969 Kurihara et al. ..... 252—62.9

OTHER REFERENCES

Bayer: "Journal of the American Ceramic Society," vol. 46, No. 12, December 1963, pp. 604–5.

TOBIAS E. LEVOW, Primary Examiner
J. COOPER, Assistant Examiner

U.S. Cl. X.R.

106—39 R